United States Patent [19]

Onoki et al.

[11] 4,128,303
[45] Dec. 5, 1978

[54] ANTI REFLECTION COATING WITH A COMPOSITE MIDDLE LAYER

[75] Inventors: Fumio Onoki, Tokorozawa; Hajime Kamiya, Kokubunji, both of Japan

[73] Assignee: Kabushiki Kaisha Hoya Lens, Tokyo, Japan

[21] Appl. No.: 790,005

[22] Filed: Apr. 22, 1977

Related U.S. Application Data

[63] Continuation-in-part of Ser. No. 673,889, Apr. 5, 1976, abandoned.

[51] Int. Cl.² .............................................. G02B 5/28
[52] U.S. Cl. .................................... 350/164; 427/165
[58] Field of Search ............................... 350/164–166; 427/162, 164–166

[56] References Cited
U.S. PATENT DOCUMENTS

| | | | |
|---|---|---|---|
| 3,604,784 | 9/1971 | Louderback | 350/164 |
| 3,958,042 | 5/1976 | Katsube | 350/164 |

Primary Examiner—Ronald J. Stern
Attorney, Agent, or Firm—Cushman, Darby & Cushman

[57] ABSTRACT

A reflection free optical glass coated, in succession, with a medium refractive index layer, such as $CeF_3$ or $Al_2O_3$, a high refractive index layer such as $TiO_2$, $CeO_2$ or $ZrO_2$ which layer contains a plurality of thin layers of $MgF_2$ of about 10–100Å in thickness uniformly interposed in the high refractive index material at intervals of about one eighth of the design wavelength. The outermost coating of the multi-layer optical glass is a low refractive index layer of $MgF_2$.

6 Claims, 4 Drawing Figures

ANTI REFLECTION COATING WITH A COMPOSITE MIDDLE LAYER

CROSS REFERENCE TO RELATED APPLICATIONS

This Application is a continuation-in-part of our earlier co-pending application Ser. No. 673,889 filed Apr. 5, 1976 now abandoned.

BACKGROUND OF THE INVENTION

1. Field of the Invention

This invention relates to a process for producing an anti-reflective protective coating for use as a photographic filter, eyeglass lenses, optical filters or the like, by vacuum sputtering.

2. Description of the Prior Art

The conventional anti-reflection coating layers, as illustrated in FIG. 1, that are generally used comprise a coating layer 2 of ¾ in thickness of the predetermined wavelength of a medium refractive index material, such as $CeF_3$ or $Al_2O_3$, coated on the glass 1 having a refractive index of 1.52; layer 3 of a high refractive index material $ZrO_2$ of $\lambda/2$ in thickness coated on layer 2; and a layer 4 of the low refractive index material $MgF_2$ of $\lambda/4$ in thickness coated on layer 3, all of these layers applied by a vacuum sputtering method. The curve of reflection ratio of this conventional coated glass is shown as dashed line $a$ in FIG. 3 and the predetermined wavelength, that is the reflection ratio at 500m microns, is about 1% which is considerably high. This reflection ratio changes with the degree of the non-uniformity or nonunity of the high refractive index material. As its non-uniformity becomes larger, reflection of the predetermined wavelength increases.

In the multiple coating layers on the glass, conventionally $ZrO_2$ has been considered to be the best material among the high refractive index materials, with respect to light absorption of the coating, strength of the adhesivity of the coating to the glass, and the stability of the refractive index. However, when the $ZrO_2$ layer is vacuum sputtered onto the glass, and as the coating thickness becomes thicker, the density of the molecules become smaller and the refractive index becomes lower, thereby providing a larger non-uniformity in the coating, thus sacrificing the anti-reflection properties of the coated glass.

SUMMARY OF THE INVENTION

To overcome the drawback of non-uniformity in the coating layers of a multiple coated glass, this invention provides a process characterized in that when material such as $ZrO_2$ having a large non-uniformity and a high refractive index is coated onto a glass by a vacuum sputtering method, a plurality of very thin layers of 10–100Å of material, such as $CeF_3$ or $MgF_2$, having a refractive index lower than that of said high refractive index material, is vacuum sputtered onto the high refraction coating at about one-eighth of the predetermined wavelength in the overall composite layer, as shown in FIG. 2.

Therefore, it is one object of this invention to provide a glass coated with a plurality of coating layers to produce an anti-reflection glass.

Another object of this invention is to provide a glass coated with a plurality of coating layers having anti-reflection characteristics produced according to the above process.

DESCRIPTION OF THE PREFERRED EMBODIMENT

The accompanying drawings are discussed below.

This invention relates to a process for providing an anti-reflection protective coating useful for photographic filters, eyeglass lenses, optical filters, and the like, by vacuum sputtering, and the multi-coated glass so produced.

Figure 1:
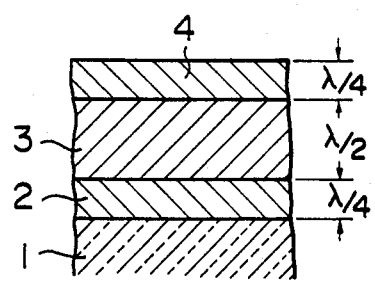
FIG. 1 is an enlarged sectional view of a conventional three part coating layer anti-reflection glass.

Recently, multiple coating layers are usually used for anti-reflection layers of optical devices; such layers comprise low refractive index materials and high refractive index materials which are alternatively sputtered onto a glass, or three coating layers comprising a medium refractive index material coated directly on the glass, a high refractive index material coated on the medium refractive index material, and a low refractive index material coated thereon and in contact with the air as illustrated in FIG. 1, or a similar arrangement of four coating layers.

Figure 4:
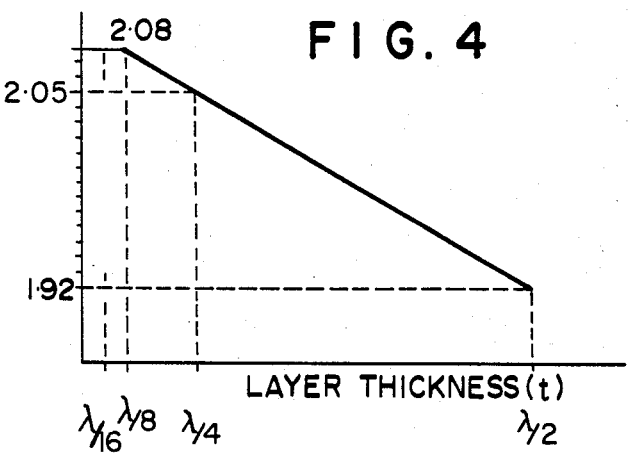
FIG. 4 is a characteristic curve of the relationship between the thickness of the $ZrO_2$ coating and the refractive index.

Materials for coating layers generally used are as follows: high refractive index coating materials include $TiO_2$, $CeO_2$ and $ZrO_2$; medium refractive index coating materials include $CeF_3$, $Al_2O_3$, and low refractive index materials include $MgF_2$. However, even when $ZrO_2$ is used, which is considered to be the highest refractive index material capable of being applied by a vacuum sputter method as a coating onto a heated glass, the refractive index of such a coating layer decreases from 2.08 to 1.92 as the layer thickness increases—this is illustrated in FIG. 4. After measuring the thickness of the $ZrO_2$ coating layer using a gauge and measuring the refractive index using a polarizing meter, where the wavelength $\lambda$ is 500 millimicrons and the temperature of the glass is 280° C., the thicknesses of the coating layers are respectively: $\lambda/16$, $\lambda/8$, $\lambda/4$ and $\lambda/2$; the refractive indicies are respectively: 2.08, 2.08, 2.05 and 1.92. As to the coating layers of $CeO_2$, where layer thickness are: $\lambda/16$, $\lambda/8$, $\lambda/4$ and $\lambda/2$, values are respectively: 2.28, 2.26, 2.02 and 1.88. According to these results, it has been known that there is very little non-uniformity of the coating layer when thickness is less than about $\lambda/8$ and therefore there is virtually no change of the refractive index of such thin layers.

Figure 2:
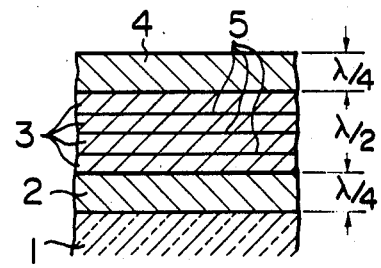
FIG. 2 is an enlarged sectional view of a part of the multiple coating layers coated onto the glass by the vacuum sputtering method according to the present invention for preventing reflection.
Figure 3:
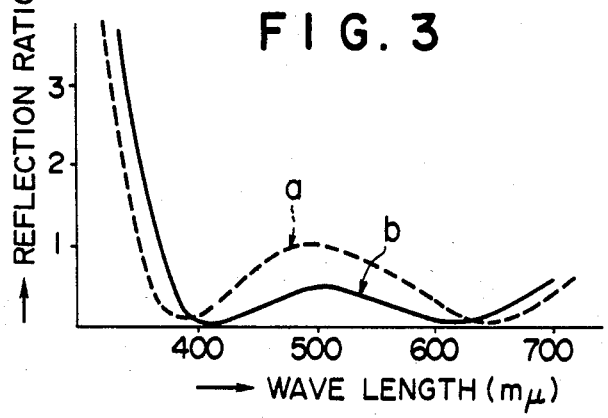
FIG. 3 illustrates characteristic curves of the reflection ratios of conventional glass (a) and an embodiment of this invention (b)

According to the present invention and referred specifically to FIG. 2, when the medium refractive index coating layer 2 of $\lambda/4$ in thickness, such as $CeF_3$, is coated on a glass having a refractive index of 1.52, and a coating layer 3 of $\lambda/2$ in thickness is coated with the high refractive index $ZrO_2$, a plurality of very thin layers 5, for example 50Å in thickness, of a low refractive index material such as $MgF_2$, are interposed between each $ZrO_2$ layer 3 at a frequency of every $\lambda/8$ as shown in FIG. 2. An additional layer 4 of a low refractive index material, such as MgF$_2$ is formed on top of the outermost layer 3, thereby providing the desirable protection of a layer of λ/4 in thickness. The refractive index curve for the resulting article is shown in FIG. 3 as solid line (b), wherein the reflection ratio is about 0.5% at 500m microns of a predetermined wavelength. This indicates a surprising and improved result in anti-reflection coated glass optics.

In a manner similar to the above we have found that CeO$_2$ as the high refractive index material and Al$_2$O$_3$ as medium refractive index material give substantially the same results. A very thin layer, for example of 10–100Å in thickness, is appropriate. The preferred embodiment describes and illustrates three coating layers however it is to be understood that multiple coating layers other than the arrangement of three layers of low refractive index coating materials may also be used.

Of the high refractive index materials ZrO$_2$ is considered to be the best with respect to the light absorption of the layer itself, its absorption strength and its refractive index stability. When ZrO$_2$ is applied as a vacuum sputter, as the layer thickness increases in the molecular density becomes smaller as well causing the refractive index to become smaller; as a consequence the non-uniformity of the sputtered layer increases owing to the change in density of molecules that are deposited as the layer of ZrO$_2$ is built up. This, in turn, results in a detrimental effect on the reflection properties of the glass so coated.

The present invention overcomes this and other disadvantages by providing for the deposition of relatively thin layers of ZrO$_2$ deposited by a vacuum sputter technique and intermediate the ZrO$_2$ layers, separate layers of a low refractive index material such as MgF$_2$ are provided. The low refractive index materials are applied by a vacuum sputter method between the various ZrO$_2$ layers at about one-eighth of the predetermined wavelength within the ZrO$_2$/MgF$_2$ composite layer area. Thicknesses of the MgF$_2$ layers each vary from about 10–100Å.

What is claimed is:

1. An anti-reflection optical glass including glass having sequentially coated thereon a plurality of layers, each layer having a thickness expressed as a fraction of a predetermined wavelength (λ) consisting essentially of:

(a) a medium refractive index layer selected from the group consisting of CeF$_3$ and Al$_2$O$_3$ having a thickness of about ¼ λ;
   (b) four sequential high refractive index layers, each of said layers selected from the group consisting of TiO$_2$, CeO$_2$ and ZrO$_2$;
   (c) three thin layers of MgF$_2$ having a thickness of about 10 to about 100Å, each of said thin layers interposed between said high refractive index layers (b) and spaced apart from each other at a distance of ⅛ λ, the plurality of layers (b) and (c) being about ¼ λ in overall thickness; and
   (d) a low refractive index layer of MgF$_2$ having a thickness of ¼ λ on top of the plurality of layers (b) and (c).

2. The optical glass of claim 1 wherein each thin layer (c) has a thickness of about 50Å.

3. The optical glass of claim 1 wherein each of said high refractive index layers (b) is ZrO$_2$.

4. A process for preparing an anti-reflection optical glass having sequentially coated thereon a plurality of coating layers, each layer having a thickness expressed as a fraction of a predetermined wave length (λ), said process including the successive steps of:

(i) applying to an optical glass a coating about ¼ λ in thickness of a medium refractive index layer selected from the group consisting of CeF$_3$ and Al$_2$O$_3$;
   (ii) applying to the thus-coated layer of step (i) a coating of a high refractive index layer selected from the group consisting of TiO$_2$, CeO$_2$ and ZrO$_2$;
   (iii) applying to the thus-coated layer of step (ii) a thin layer of MgF$_2$ having a thickness of between about 10 and 100Å;
   (iv) repeating steps (ii) and (iii) until four of said layers (ii) and three of said layers (iii) are deposited, provided that:
   the thin layers of MgF$_2$ are interposed between the high refractive index layers and spaced apart from each other at a distance of about ⅛ λ; the plurality of layers thus formed is about ¼ λ in overall thickness;
   (v) applying to the thus applied top layer of step (iv) a coating of about ¼ λ in thickness of low refractive index MgF$_2$.

5. The process of claim 4 wherein each thin layer of MgF$_2$ applied in steps (iii) and (iv) has a thickness of about 50Å.

6. The process of claim 4 wherein said high refractive index material of step (ii) is ZrO$_2$.

* * * * *